US 9,224,114 B2

(12) United States Patent
Ingman et al.

(10) Patent No.: US 9,224,114 B2
(45) Date of Patent: *Dec. 29, 2015

(54) METHODS, SYSTEMS, AND COMPUTER-READABLE MEDIA FOR GENERATING A REPORT INDICATING JOB AVAILABILITY

(71) Applicant: AT&T Intellectual Property I, L.P., Atlanta, GA (US)

(72) Inventors: Robert Ingman, Peachtree City, GA (US); Robert Cole, Birmingham, AL (US); Richard Miller, Hoover, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/758,249

(22) Filed: Feb. 4, 2013

(65) Prior Publication Data

US 2013/0151304 A1    Jun. 13, 2013

Related U.S. Application Data

(63) Continuation of application No. 11/778,999, filed on Jul. 17, 2007, now Pat. No. 8,380,744.

(51) Int. Cl.
*G06F 7/00* (2006.01)
*G06Q 10/06* (2012.01)

(52) U.S. Cl.
CPC .......... *G06Q 10/06312* (2013.01); *G06Q 10/06* (2013.01)

(58) Field of Classification Search
CPC ............ G06Q 10/06; G06Q 10/06311; G06Q 10/063116; G06Q 10/103; G06Q 10/1097; G06Q 10/20; G06Q 10/06398; G06Q 10/10

USPC ........ 707/603, 688, 826, 827; 705/7.16, 7.13, 705/7.21
See application file for complete search history.

(56) References Cited

U.S. PATENT DOCUMENTS 4,509,123 A    4/1985  Vereen
4,937,743 A    6/1990  Rassman et al.
(Continued)

FOREIGN PATENT DOCUMENTS

EP    1139247 A1    10/2001

OTHER PUBLICATIONS

U.S. Appl. No. 11/779,011, Office Action mailed Mar. 19, 2014.
(Continued)

*Primary Examiner* — Mariela Reyes
*Assistant Examiner* — Linh Black
(74) *Attorney, Agent, or Firm* — Hartman & Citrin LLC

(57) ABSTRACT

Methods, systems, and computer-readable media provide for generating a report indicating job availability. According to embodiments, a method for generating a report indicating job availability is provided. According to the method, a selected assignment group is displayed. A number of status messages received by a technician in the selected assignment group is displayed. The status messages indicate that no jobs are available for the technician. An amount of lost time associated with the technician in the selected assignment group is determined. The lost time includes a difference between a time at which the technician received one of the status messages and a time at which the technician is dispatched to a next job. The amount of lost time associated with the technician in the selected assignment group is displayed.

20 Claims, 9 Drawing Sheets

(56) References Cited

U.S. PATENT DOCUMENTS

| | | |
|---|---|---|
| 5,155,689 A | 10/1992 | Wortham |
| 5,214,281 A | 5/1993 | Rowe |
| 5,467,268 A | 11/1995 | Sisley et al. |
| 5,515,510 A | 5/1996 | Kikinis |
| 5,542,088 A | 7/1996 | Jennings, Jr. et al. |
| 5,590,269 A | 12/1996 | Kruse et al. |
| 5,615,121 A | 3/1997 | Babayev et al. |
| 5,623,404 A | 4/1997 | Collins et al. |
| 5,751,450 A | 5/1998 | Robinson |
| 5,757,290 A | 5/1998 | Watanabe et al. |
| 5,758,264 A | 5/1998 | Bonta et al. |
| 5,778,345 A | 7/1998 | McCartney |
| 5,920,846 A | 7/1999 | Storch et al. |
| 5,943,652 A | 8/1999 | Sisley et al. |
| 5,963,911 A | 10/1999 | Walker et al. |
| 5,987,377 A | 11/1999 | Westerlage et al. |
| 6,006,171 A | 12/1999 | Vines et al. |
| 6,078,255 A | 6/2000 | Dividock et al. |
| 6,078,894 A * | 6/2000 | Clawson et al. ............. 705/7.42 |
| 6,134,530 A | 10/2000 | Bunting et al. |
| 6,275,812 B1 | 8/2001 | Haq et al. |
| 6,415,259 B1 | 7/2002 | Wolfinger et al. |
| 6,445,968 B1 | 9/2002 | Jalla |
| 6,578,005 B1 | 6/2003 | Lesaint et al. |
| 6,633,900 B1 | 10/2003 | Khalessi et al. |
| 6,639,982 B1 | 10/2003 | Stuart et al. |
| 6,684,136 B2 | 1/2004 | Sinex |
| 6,845,394 B2 | 1/2005 | Ritche |
| 6,889,196 B1 | 5/2005 | Clark |
| 6,904,408 B1 | 6/2005 | McCarthy et al. |
| 6,934,379 B2 | 8/2005 | Falcon et al. |
| 6,941,514 B2 | 9/2005 | Bradford |
| 6,987,837 B1 * | 1/2006 | Blank et al. .................. 379/1.01 |
| 6,990,458 B2 | 1/2006 | Harrison et al. |
| 7,065,456 B1 | 6/2006 | Butka et al. |
| 7,085,280 B2 | 8/2006 | Martin |
| 7,127,412 B2 | 10/2006 | Powell et al. |
| 7,171,375 B2 | 1/2007 | Clarke |
| 7,222,082 B1 | 5/2007 | Adhikari et al. |
| 7,283,971 B1 | 10/2007 | Levine et al. |
| 7,346,531 B2 | 3/2008 | Jacobs |
| 7,502,747 B1 * | 3/2009 | Pardo et al. .................. 705/7.13 |
| 7,634,431 B2 | 12/2009 | Stratton |
| 7,640,196 B2 | 12/2009 | Weiss |
| 7,725,857 B2 | 5/2010 | Foltz et al. |
| 7,729,939 B2 | 6/2010 | Richardson et al. |
| 8,041,616 B2 | 10/2011 | Cullen et al. |
| 8,249,905 B2 | 8/2012 | Ingman et al. |
| 8,380,744 B2 * | 2/2013 | Ingman et al. ................ 707/782 |
| 8,396,571 B2 | 3/2013 | Costiner et al. |
| 8,509,246 B2 | 8/2013 | Stewart |
| 2001/0032103 A1 | 10/2001 | Sinex |
| 2001/0037229 A1 | 11/2001 | Jacobs et al. |
| 2001/0049619 A1 | 12/2001 | Powell et al. |
| 2002/0010615 A1 | 1/2002 | Jacobs et al. |
| 2002/0015064 A1 | 2/2002 | Robotham et al. |
| 2002/0029161 A1 | 3/2002 | Brodersen et al. |
| 2002/0040313 A1 | 4/2002 | Hunter et al. |
| 2002/0065700 A1 | 5/2002 | Powell et al. |
| 2002/0069018 A1 | 6/2002 | Brueckner et al. |
| 2002/0069235 A1 | 6/2002 | Chen |
| 2002/0076031 A1 | 6/2002 | Falcon et al. |
| 2002/0125998 A1 | 9/2002 | Petite et al. |
| 2002/0143469 A1 | 10/2002 | Alexander et al. |
| 2002/0152290 A1 | 10/2002 | Ritche |
| 2003/0033184 A1 | 2/2003 | Benbassat et al. |
| 2003/0061068 A1 | 3/2003 | Curtis |
| 2003/0069797 A1 | 4/2003 | Harrison |
| 2003/0088492 A1 | 5/2003 | Damschroder |
| 2003/0120538 A1 | 6/2003 | Boerke et al. |
| 2003/0139955 A1 | 7/2003 | Kirii et al. |
| 2003/0149598 A1 | 8/2003 | Santoso et al. |
| 2003/0152045 A1 | 8/2003 | Martin |
| 2003/0167238 A1 | 9/2003 | Zeif |
| 2003/0182052 A1 | 9/2003 | Delorme et al. |
| 2003/0187710 A1 | 10/2003 | Baumer et al. |
| 2003/0216957 A1 | 11/2003 | Florence et al. |
| 2003/0220734 A1 | 11/2003 | Harrison et al. |
| 2003/0233278 A1 | 12/2003 | Marshall |
| 2004/0010334 A1 | 1/2004 | Bickley et al. |
| 2004/0015367 A1 | 1/2004 | Nicastro et al. |
| 2004/0019542 A1 | 1/2004 | Fuchs et al. |
| 2004/0064436 A1 | 4/2004 | Breslin et al. |
| 2004/0111311 A1 | 6/2004 | Ingman et al. |
| 2004/0111312 A1 | 6/2004 | Ingman et al. |
| 2004/0111313 A1 | 6/2004 | Ingman et al. |
| 2004/0111634 A1 | 6/2004 | Ingman et al. |
| 2004/0204969 A1 | 10/2004 | Wu |
| 2004/0220825 A1 | 11/2004 | Schwerin-Wenzel et al. |
| 2004/0234043 A1 | 11/2004 | Argo |
| 2004/0249743 A1 | 12/2004 | Virginas et al. |
| 2004/0254805 A1 | 12/2004 | Schwerin-Wenzel et al. |
| 2005/0015504 A1 | 1/2005 | Dorne et al. |
| 2005/0021384 A1 | 1/2005 | Pantaleo et al. |
| 2005/0043986 A1 | 2/2005 | McConnell et al. |
| 2005/0094772 A1 | 5/2005 | Harrison et al. |
| 2005/0096962 A1 | 5/2005 | Narasimhan et al. |
| 2005/0100137 A1 | 5/2005 | Beamon |
| 2005/0119930 A1 | 6/2005 | Simon |
| 2005/0131943 A1 | 6/2005 | Lewis et al. |
| 2005/0144058 A1 | 6/2005 | Luo |
| 2005/0171877 A1 | 8/2005 | Weiss |
| 2005/0228725 A1 | 10/2005 | Rao et al. |
| 2005/0288970 A1 | 12/2005 | Holcom et al. |
| 2006/0015393 A1 | 1/2006 | Eisma et al. |
| 2006/0031110 A1 | 2/2006 | Benbassat et al. |
| 2006/0050854 A1 | 3/2006 | Beamon |
| 2006/0053035 A1 | 3/2006 | Eisenberg |
| 2006/0064305 A1 | 3/2006 | Alonso |
| 2006/0064338 A1 | 3/2006 | Brotman et al. |
| 2006/0090160 A1 | 4/2006 | Forsythe et al. |
| 2006/0111957 A1 | 5/2006 | Carmi et al. |
| 2006/0129691 A1 | 6/2006 | Coffee et al. |
| 2006/0150077 A1 | 7/2006 | Sheldon et al. |
| 2006/0182527 A1 | 8/2006 | Ranstrom et al. |
| 2006/0206246 A1 | 9/2006 | Walker |
| 2006/0213817 A1 | 9/2006 | Scott et al. |
| 2006/0235739 A1 | 10/2006 | Levis et al. |
| 2006/0241853 A1 | 10/2006 | Gadler |
| 2006/0241855 A1 | 10/2006 | Joe et al. |
| 2006/0244638 A1 | 11/2006 | Lettau |
| 2007/0043464 A1 | 2/2007 | Zeif |
| 2007/0078988 A1 | 4/2007 | Miloushev et al. |
| 2007/0087756 A1 | 4/2007 | Hoffberg |
| 2007/0129082 A1 | 6/2007 | Thacher |
| 2007/0129880 A1 | 6/2007 | Thacher |
| 2007/0174101 A1 | 7/2007 | Li et al. |
| 2007/0179830 A1 | 8/2007 | Iknoian |
| 2007/0211881 A1 | 9/2007 | Parker-Stephen |
| 2007/0219842 A1 | 9/2007 | Bansal et al. |
| 2007/0226090 A1 | 9/2007 | Stratton |
| 2007/0251988 A1 | 11/2007 | Ahsan et al. |
| 2007/0279214 A1 | 12/2007 | Buehler |
| 2007/0282654 A1 | 12/2007 | Sarkar |
| 2008/0016436 A1 | 1/2008 | Liu et al. |
| 2008/0046803 A1 | 2/2008 | Beauchamp et al. |
| 2008/0065456 A1 | 3/2008 | Labedz et al. |
| 2008/0140597 A1 | 6/2008 | Satir et al. |
| 2008/0162242 A1 | 7/2008 | Schneur et al. |
| 2008/0172242 A1 | 7/2008 | Hyatt |
| 2008/0263491 A1 | 10/2008 | Foltz et al. |
| 2009/0020297 A1 | 1/2009 | Ingman et al. |
| 2009/0024431 A1 | 1/2009 | Ingman et al. |
| 2009/0024435 A1 | 1/2009 | Ingman et al. |
| 2009/0024436 A1 | 1/2009 | Ingman et al. |
| 2009/0024437 A1 | 1/2009 | Ingman et al. |
| 2009/0024438 A1 | 1/2009 | Ingman et al. |
| 2009/0024455 A1 | 1/2009 | Ingman et al. |
| 2009/0024646 A1 | 1/2009 | Ingman et al. |
| 2009/0024957 A1 | 1/2009 | Ingman et al. |
| 2009/0024999 A1 | 1/2009 | Ingman et al. |
| 2009/0177375 A1 | 7/2009 | Jung et al. |

(56) References Cited

U.S. PATENT DOCUMENTS

2012/0259670 A1 10/2012 Ingman et al.
2012/0265577 A1 10/2012 Ingman et al.
2013/0014062 A1 1/2013 Ingman et al.

OTHER PUBLICATIONS

Notice of Allowance mailed May 14, 2013 in U.S. Appl. No. 13/688,588.
U.S. Appl. No. 13/525,979, Office Action mailed Sep. 17, 2013.
Office Action mailed Sep. 18, 2014 in U.S. Appl. No. 11/779,011.
"MDSI Mobile Data Solutions—Innovative and effective mobile workforce management and wireless connection", 1998, www.mdsi-advantex.com, pp. 1-31.
Lesaint et al., "Engineering Dynamic Scheduler for Work Manager", Jul. 1998, BT Technol J, 16(3):16-29.
Dimitri Golenko-Ginzburg, Zilla Simuany-Stern, Valdimir Kats, "A Multilevel Decision-Making System with Multipleresources for Controlling Cotton Harvesting" Int. J. Production Economics 46-47 (1996) pp. 55-63.
Xu et al., Effective Heuristic Procedures for a Field Technician Scheduling Problem (2001) Kluwer Academic Publishers, p. 495-509.
Wennberg, J. et al., "Finding Equillibrium in U.S. Physician Supply," Health Affairs vol. 12, Issue:2 pp. 89-103 DOI: 10.1377/hlthaff.12.2.89 Published: SUM 1993.
U.S. Office Action dated Feb. 2, 2010 in U.S. Appl. No. 11/778,867.
U.S. Office Action dated Aug. 23, 2010 in U.S. Appl. No. 11/778,919.
U.S. Office Action dated Dec. 9, 2010 in U.S. Appl. No. 11/778,919.
U.S. Office Action dated Aug. 25, 2011 in U.S. Appl. No. 11/778,919.
U.S. Notice of Allowance dated Dec. 19, 2011 in U.S. Appl. No. 11/778,919.
U.S. Office Action dated Oct. 13, 2010 in U.S. Appl. No. 11/778,953.
U.S. Office Action dated Mar. 24, 2011 in U.S. Appl. No. 11/778,953.
U.S. Notice of Allowance dated Sep. 27, 2012 in U.S. Appl. No. 11/778,953.
U.S. Office Action dated Apr. 15, 2010 in U.S. Appl. No. 11/778,962.
U.S. Office Action dated Aug. 26, 2010 in U.S. Appl. No. 11/778,962.
U.S. Office Action dated Jan. 25, 2011 in U.S. Appl. No. 11/778,962.
U.S. Office Action dated Feb. 21, 2012 in U.S. Appl. No. 11/778,962.
U.S. Notice of Allowance dated Jul. 26, 2012 in U.S. Appl. No. 11/778,962.
U.S. Office Action dated Apr. 1, 2010 in U.S. Appl. No. 11/778,999.
U.S. Office Action dated Sep. 24, 2010 in U.S. Appl. No. 11/778,999.
U.S. Notice of Allowance dated May 3, 2011 in U.S. Appl. No. 11/778,999.
U.S. Office Action dated Nov. 24, 2010 in U.S. Appl. No. 11/779,011.
U.S. Office Action dated May 11, 2011 in U.S. Appl. No. 11/779,011.
U.S. Office Action dated Apr. 25, 2012 in U.S. Appl. No. 11/779,011.
U.S. Office Action dated Oct. 11, 2012 in U.S. Appl. No. 11/779,011.
U.S. Office Action dated Feb. 4, 2011 in U.S. Appl. No. 11/779,027.
U.S. Notice of Allowance dated Aug. 4, 2011 in U.S. Appl. No. 11/779,027.
U.S. Office Action dated Nov. 16, 2010 in U.S. Appl. No. 11/779,054.
U.S. Notice of Allowance dated May 12, 2011 in U.S. Appl. No. 11/779,054.
U.S. Notice of Allowance dated Aug. 24, 2011 in U.S. Appl. No. 11/779,054.
U.S. Office Action dated Feb. 1, 2011 in U.S. Appl. No. 11/779,073.
U.S. Office Action dated Oct. 27, 2010 in U.S. Appl. No. 11/779,087.
U.S. Notice of Allowance dated Mar. 24, 2011 in U.S. Appl. No. 11/779,087.
U.S. Office Action dated Aug. 22, 2012 in U.S. Appl. No. 13/533,402.
U.S. Notice of Allowance dated Dec. 27, 2012 in U.S. Appl. No. 13/533,402.
U.S. Appl. No. 13/688,588, filed Nov. 29, 2012.
U.S. Appl. No. 11/779,011 Office Action dated Dec. 2, 2013.
Office Action mailed Apr. 2, 2015 in U.S. Appl. No. 11/779,011.

\* cited by examiner

Fig. 1

LOST TIME

SUMMARY  DETAILS

Please select the WMC followed by any or all of the following:

WMC: [▼] ← 502

ASGN GROUP: [▼] ← 504

Start Date: [▼] ← 506

End Date: [▼] ← 508

[Get Report] ← 510

METHODS, SYSTEMS, AND COMPUTER-READABLE MEDIA FOR GENERATING A REPORT INDICATING JOB AVAILABILITY

CROSS-REFERENCE TO RELATED APPLICATIONS

The present application is a continuation of U.S. patent application Ser. No. 11/778,999, titled "Methods, Systems, and Computer-Readable Media for Generating a Report Indicating Job Availability," filed Jul. 17, 2007, now U.S. Pat. No. 8,380,744, which is related to commonly assigned U.S. Pat. No. 8,352,302, titled "Methods, Systems, And Computer-Readable Media For Determining A Plurality Of Turfs From Where To Reallocate A Workforce To A Given Turf," filed Jul. 17, 2007; commonly assigned U.S. Pat. No. 8,060,401, titled "Methods, Systems, And Computer-Readable Media For Providing An Indication Of A Schedule Conflict," filed Jul. 17, 2007; commonly assigned U.S. Pat. No. 8,069,072, titled "Methods, Systems, And Computer-Readable Media For Providing An Indication Of Hightime," filed Jul. 17, 2007; commonly assigned U.S. Pat. No. 8,249,905, titled "Methods, Systems, And Computer-Readable Media For Providing Future Job Information," filed Jul. 17, 2007; commonly assigned U.S. patent application Ser. No. 11/778,867, now abandoned, titled "Methods, Systems, And Computer-Readable Media For Providing Notification Of A Last Job Dispatch," filed Jul. 17, 2007; commonly assigned U.S. Pat. No. 8,239,232, titled "Methods, Systems, And Computer-Readable Media For Providing Commitments Information Relative To A Turf," filed Jul. 17, 2007; commonly assigned U.S. Pat. No. 8,341,547, titled "Methods, Systems, And Computer-Readable Media For Providing Contact Information At Turf Level," filed Jul. 17, 2007; commonly assigned U.S. patent application Ser. No. 11/779,011, titled "Methods, Systems, And Computer-Readable Media For Providing A Ratio Of Tasks Per Technician," filed Jul. 17, 2007; and commonly assigned U.S. patent application Ser. No. 11/779,073, now abandoned, titled "Methods, Systems, And Computer-Readable Media For Providing Workforce To Load Information," filed Jul. 17, 2007; each of which is hereby incorporated herein by reference.

TECHNICAL FIELD

This application relates generally to the field of load balancing. More specifically, the disclosure provided herein relates to the field of dynamic workforce reallocation.

BACKGROUND

Telecommunications networks may provide a number of services, such as plain old telephone service ("POTS"), digital subscriber line ("DSL"), and cable. Maintenance of the telecommunications network generally involves the assignment of an appropriate technician to each outstanding job such that all of the outstanding jobs are timely filled. When a technician finishes one job and is ready to be dispatched to another job, the technician may receive next job information. The next job information may include, for example, the location of the next job and the type of work to be done in the next job. The technician may receive the next job information via a portable computing device, such as a laptop computer, which enables the technician to receive the job information out in the field without having to return to a base station.

A sufficient number of technicians are typically hired to comfortably fill an estimated number of jobs. There may be times, however, when the availability of technicians is greater than the availability of jobs for which the available technicians are qualified. In such a case, instead of receiving next job information on the portable computing device when the technician is ready to be dispatched to another job, the technician will receive a No Jobs Available ("NJA") message. The NJA message may be transmitted to the technician from a load balance personal computer ("PC") responsible for dispatching technicians to jobs.

The amount of unproductive time between the technician receiving a NJA message and being dispatched to the next job is known as Lost Productive Time ("LPT"). LPT may be a significant expense for entities involved in scheduling and dispatching technicians or other personnel. As such, the ability to track LPT may prove valuable for supervisors and managers responsible for dispatching the technicians.

LPT may conventionally be estimated by manually retrieving a technician's work list (i.e., a list containing the time periods in which the technician was dispatched to jobs) and calculating the amount of time between jobs on the work list. The work list, however, generally provides no information regarding whether or when the technician received a NJA message. Thus, no way existed to associate the amount of time between jobs with the NJA message to more precisely determine the LPT.

SUMMARY

Embodiments of the disclosure presented herein include methods, systems, and computer-readable media for generating a report indicating job availability. According to one aspect, a method for generating a report indicating job availability is provided. According to the method, a selected assignment group is displayed. A number of status messages received by a technician in the selected assignment group is displayed. The status messages indicate that no jobs are available for the technician. An amount of lost time associated with the technician in the selected assignment group is displayed. The lost time includes a difference between a time at which the technician received one of the status messages and a time at which the technician is dispatched to a next job. The amount of lost time associated with the technician in the selected assignment group is displayed.

According to another aspect, a system for generating a report indicating job availability is provided. The system includes a memory and a processor functionally coupled to the memory. The memory stores a program containing code for generating the report indicating job availability. The processor is responsive to computer-executable instructions contained in the program and operative to display a selected assignment group, display a number of status messages received by a technician in the selected assignment group, determine an amount of lost time associated with the technician in the selected assignment group, and display the amount of lost time associated with the technician in the selected assignment group. The status messages may indicate that no jobs are available for the technician. According to exemplary embodiments, the lost minutes comprise a difference between a time at which the technician received one of the status messages and a time at which the technician is dispatched to a next job.

According to yet another aspect, a computer-readable medium having instructions stored thereon for execution by a processor to perform a method for generating a report indicating job availability is provided. According to the method, a selected assignment group is displayed. A number of status messages received by a technician in the selected assignment group is displayed. The status messages indicate that no jobs are available for the technician. An amount of lost time associated with the technician in the selected assignment group is displayed. The lost time includes a difference between a time at which the technician received one of the status messages and a time at which the technician is dispatched to a next job. The amount of lost time associated with the technician in the selected assignment group is displayed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 1 is a diagram of an exemplary embodiment of a graphical user interface ("GUI") in a previous version.

FIG. 6 is a diagram illustrating a NJA report selection menu, in accordance with exemplary embodiments.

DETAILED DESCRIPTION

The following detailed description is directed to methods, systems, and computer-readable media for generating a report indicating job availability (e.g., a No Jobs Available ("NJA") report). In the following detailed description, references are made to the accompanying drawings that form a part hereof, and which are shown by way of illustration specific embodiments or examples.

As used herein, the terms "work order," "job," and "task" are used interchangeably. Although not so limited, embodiments described herein primarily refer to a "work order" as the maintenance and repair of a telecommunications network by a technician. However, it will be apparent to one of ordinary skill in the art that, in further embodiments, a "work order" may include any suitable service that involves the allocation and reallocation of personnel to perform the service. As used herein, a technician refers to any suitable personnel for performing a service.

Embodiments described herein provide a Next Generation Load Balance ("NGLB") tool for work force reallocation. According to exemplary embodiments, the NGLB tool has a graphical user interface ("GUI") containing an organized overview of work order and technician statuses within a plurality of turfs. The NGLB tool may be utilized by a load balance supervisor ("LBS") or other load balancing personnel to aid in the coordination of work force reallocation within the plurality of turfs. In one embodiment, the NGLB tool is provided to the LBS as a web-based application that can be accessed remotely via, for example, a web browser.

Figure 3:
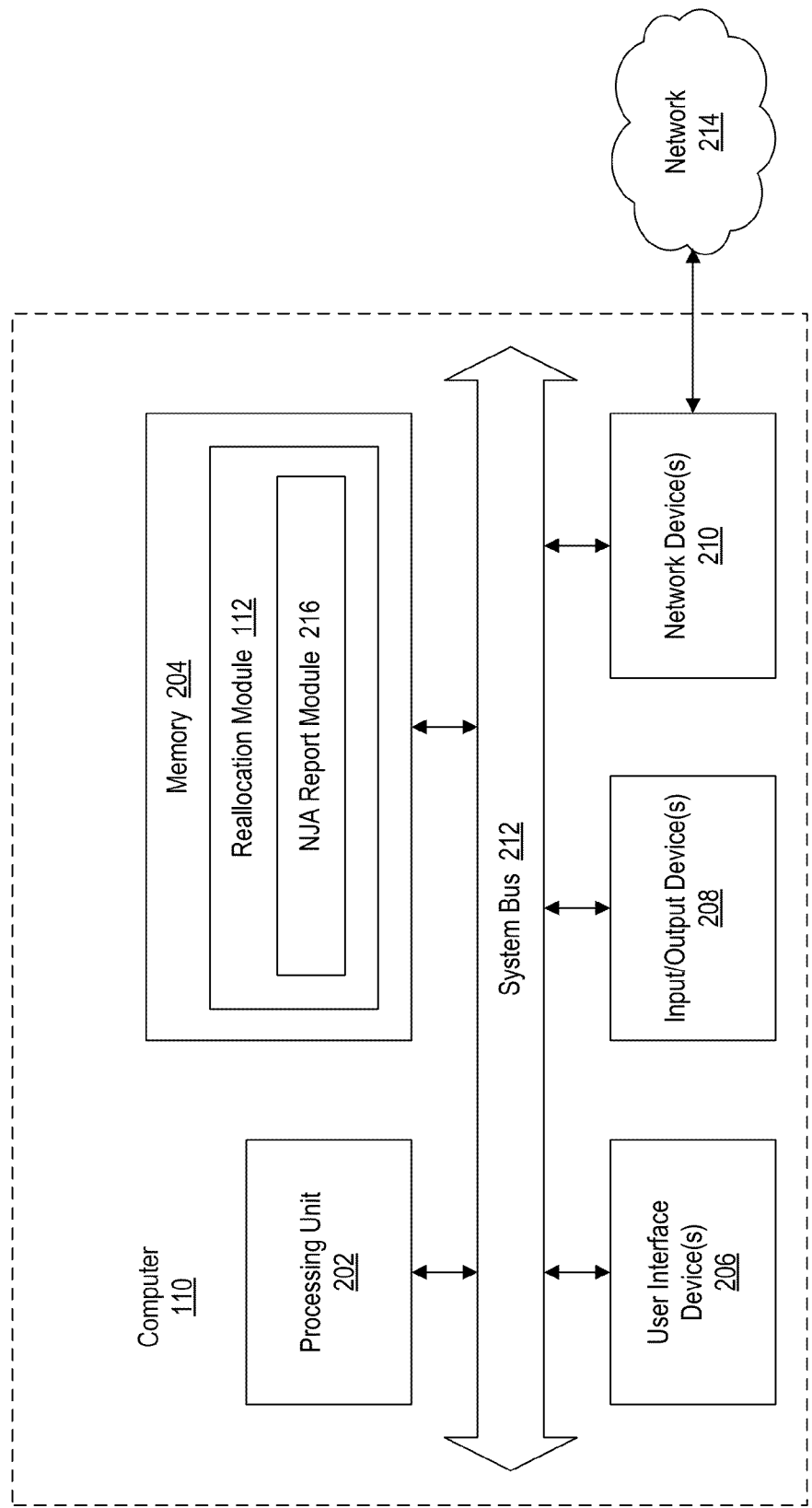
FIG. 3 is a block diagram illustrating a computer configured to generate a No Jobs Available ("NJA") report, in accordance with exemplary embodiments.
Figure 4:
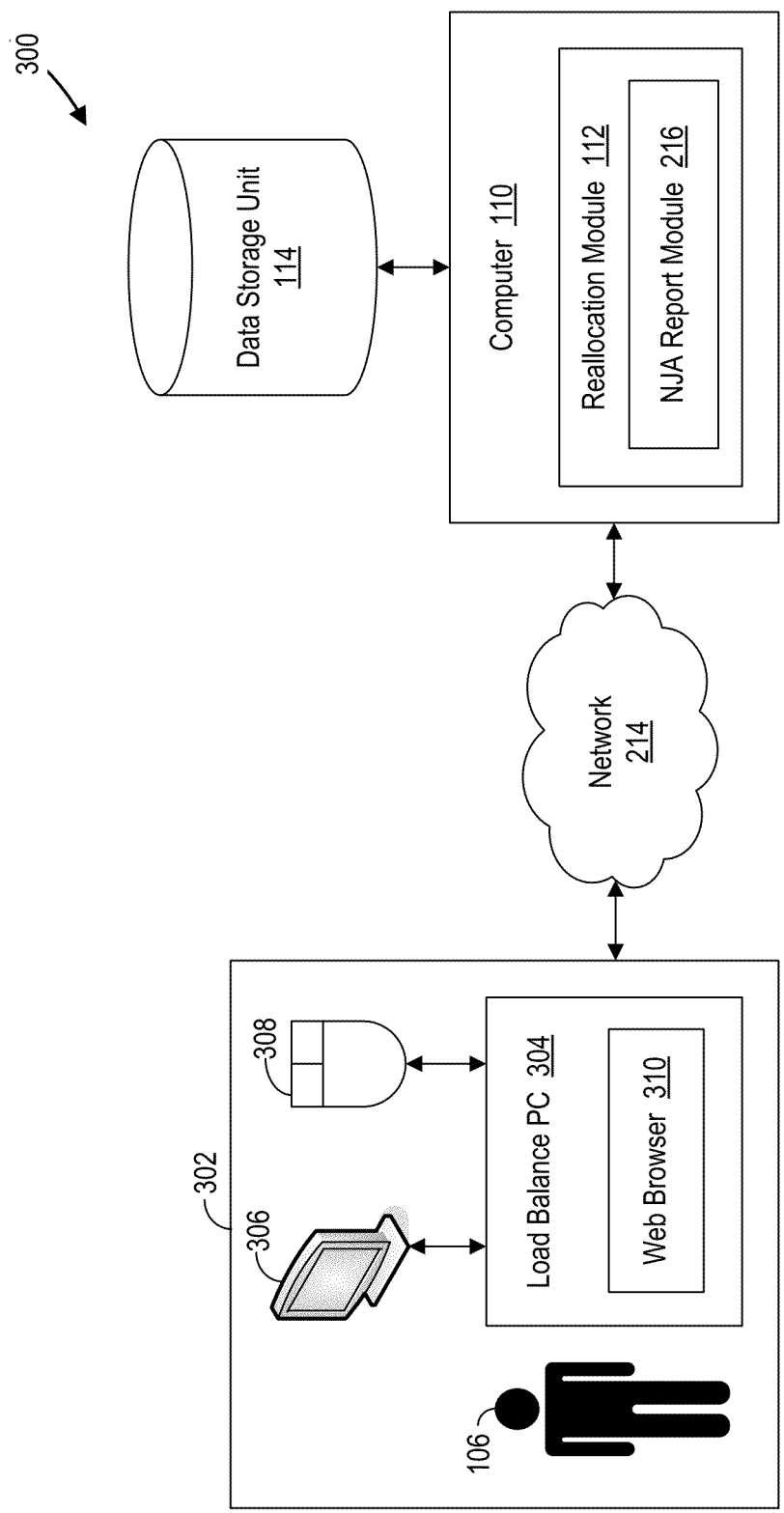
FIG. 4 is a block diagram of a workforce reallocation system, in accordance with exemplary embodiments.

According to further embodiments, the NGLB tool includes a No Jobs Available ("NJA") report module, such as a NJA report module 216 of FIGS. 3 and 4. The NJA report module 216 generates a NJA report, such as a NJA summary report 402 of FIG. 7 and a NJA details report 404 of FIG. 8, according to one embodiment. The NJA report may provide any suitable information related to the NJA message including, but not limited to, the names of the technicians who received the NJA message, the identification (ID) number of the technicians who received the message, the number of times each technician received the NJA message, the type of job to which each technician is dispatched after receiving the NJA message, the amount of time between receiving the NJA message and the next dispatch (i.e., lost time), the amount of time that may be disregarded from the lost time (i.e., disregarded time), the time at which the NJA message is received, the time at which each technician is dispatched to the next job, and each technician's field supervisor. The NJA report enables the LBS or other load balancing personnel to easily and quickly determine Lost Productive Time ("LPT") and related information with respect to the technicians. In one embodiment, LPT is determined by subtracting the disregarded time from the lost time. An example of disregarded time may be lunch time.

Figure 1:
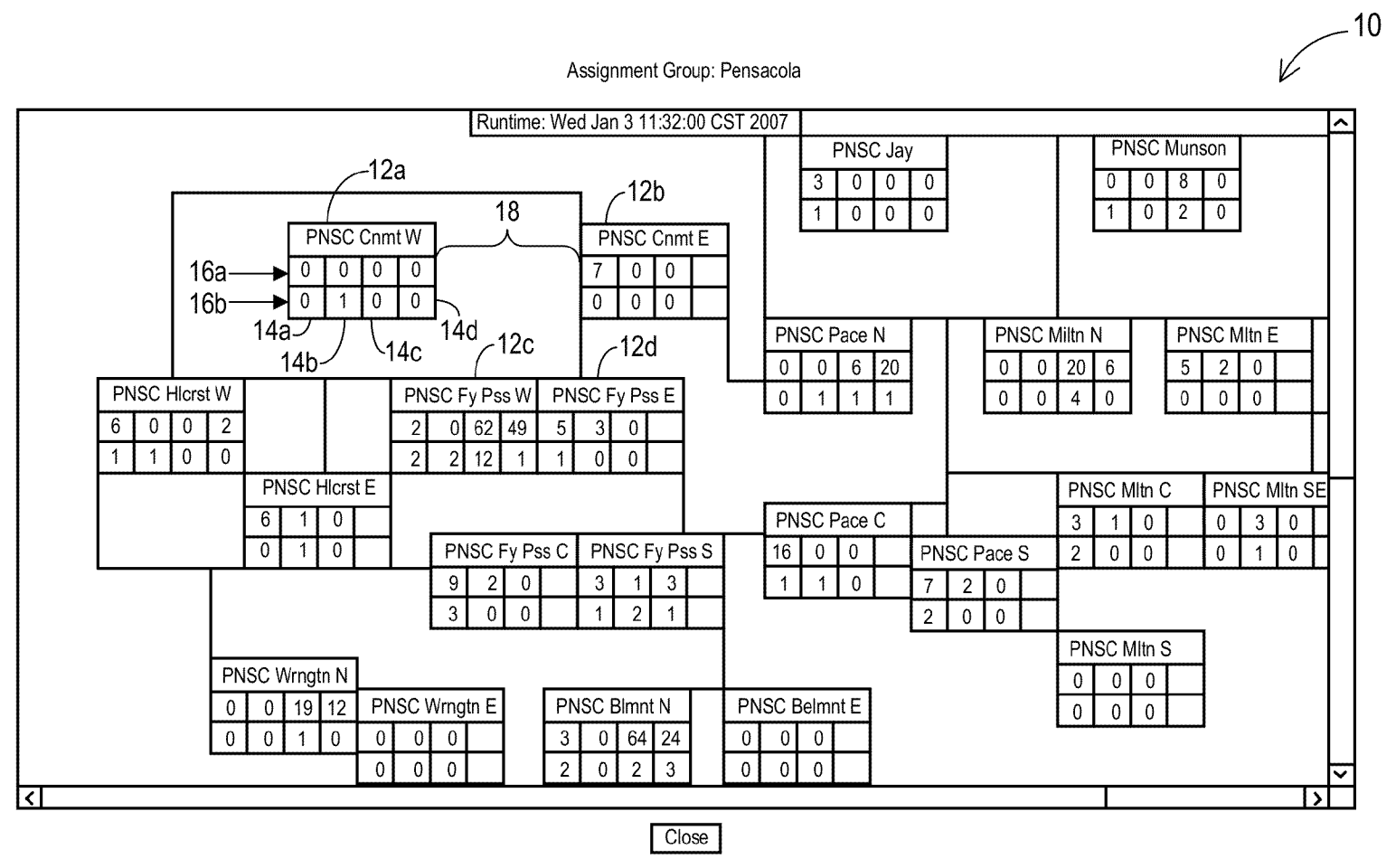

Referring now to the drawings, it is to be understood that like numerals represent like elements through the several figures, and that not all components and/or steps described and illustrated with reference to the figures are required for all embodiments. FIG. 1 is an exemplary embodiment of the GUI 10 utilized in a previous version of the NGLB tool implemented by assignee of this application on or about April 2005. As illustrated in FIG. 1, the GUI 10 includes a plurality of turfs, such as turfs 12a, 12b, 12c, 12d. Each of the turfs, such as the turf 12a, includes four columns 14a, 14b, 14c, 14d. Each of the four columns 14a, 14b, 14c, 14d includes a first cell 16a and a second cell 16b. The first cell 16a includes job information and the second cell 16b includes technician information, according to one embodiment. The GUI 10 provides map presentation of the turfs 12a, 12b, 12c, 12d. The map presentation provides a visual mapping of physical distances between each of the plurality of the turfs 12a, 12b, 12c, 12d. In one example, the physical distance between the turf 12a and the turf 12b is a distance 18. In another example, the turf 12c and turf 12d are contiguous as indicated by the turf 12c being in contact with the turf 12d in the GUI 10.

Figure 2:
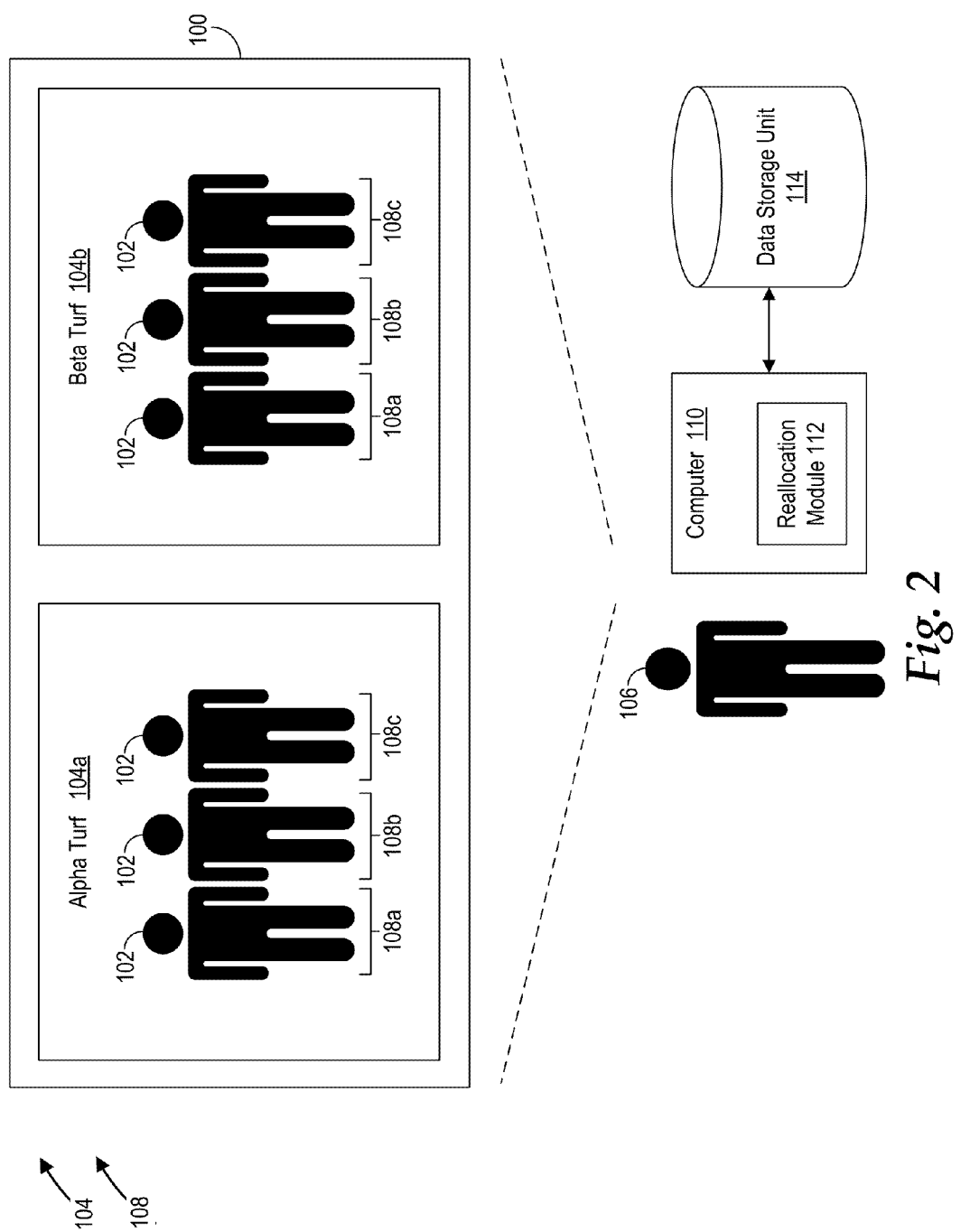
FIG. 2 is a high-level diagram illustrating an allocation of technicians for maintaining and repairing a telecommunications network, in accordance with exemplary embodiments.

FIGS. 2-9 as described below illustrate a current version of the NGLB tool. FIG. 2 is a high-level diagram illustrating an allocation of technicians 102 for maintaining and repairing a telecommunications network 100, in accordance with exemplary embodiments. The telecommunications network 100 is maintained and repaired by a plurality of technicians 102. As illustrated in FIG. 2, each of the plurality of technicians 102 is assigned to Alpha turf 104a or Beta turf 104b (collectively turfs 104) by a LBS 106 or other load balancing personnel. Each turf 104 includes a plain old telephone service ("POTS") bucket 108a, a digital subscriber line ("DSL") bucket 108b, and a cable bucket 108c (collectively buckets 108), according to one embodiment. Each of the plurality of buckets 108 represents a discipline in which a technician 102 may be assigned based on the skill set of the technician 102. In particular, the technician 102 in the POTS bucket 108a should have a skill set for completing POTS related work orders. The technician 102 in the DSL bucket 108b should have a skill set for completing DSL related work orders. And the technician 102 in the cable bucket 108c should have a skill set for completing cable related work orders. In one embodiment, one or more technicians 102 may include multiple skill sets for completing work orders under multiple buckets 108. The technicians 102 may be managed by one or more field supervisors (not shown). For example, the technicians 102 in each bucket 108 may be managed by a separate field supervisor.

For the sake of simplicity and without limitation, only two turfs 104a and 104b and three buckets 108a, 108b, and 108c are illustrated in FIG. 2. However, it will be apparent to those of ordinary skill in the art that the telecommunications network 100 may include any suitable number of turfs 104 and any suitable number and types of buckets 108, according to further embodiments.

The LBS 106 utilizes a computer 110 to aid in reallocating the plurality of technicians 102 across the turfs 104. The computer 110 includes a reallocation module 112, which enables the computer 110 to display a graphical user interface ("GUI") (not shown) that provides the LBS 106 with an organized, visual presentation of the technicians 102, the turfs 104, and the buckets 108, according to one embodiment. In one example, if work orders in the Alpha turf 104a cannot be timely filled without additional technicians 102, the LBS 106 may view the GUI to determine if the technicians 102 in the Beta turf 104b can be utilized. In a further example, if service orders in the POTS bucket 108a cannot be timely filled without additional technicians 102, the LBS 106 may view the GUI to determine if the technicians 102 in the DSL bucket 108b or the cable bucket 108c are qualified to fill POTS work orders. In one embodiment, the computer 110 functions as a web server located remotely from the LBS 106 by executing a web server application, such as BEA WEBLOGIC SERVER from BEA SYSTEMS. In this embodiment, the LBS 106 may access the GUI over a network, such as a network 214 of FIGS. 3 and 4, using, for example, a local web browser interface on a personal computer ("PC") or other computing device.

In one embodiment, the reallocation module 112 generates at least a portion of the GUI based on data stored in a data storage unit 114. The data storage unit 114 may store any suitable data related to the technicians 102, such as the location, skills, schedule, and availability of the technicians 102. The data storage unit 114 may be a database. In one embodiment, the data storage unit 114 is an Integrated Dispatch System ("IDS"). The IDS is described in greater detail in U.S. Patent Application Publication No. 2004/0111311, entitled "Turfs and Skills for Multiple Technicians," to Ingman et al.; U.S. Patent Application Publication No. 2004/0111312, entitled "Validating Turfs for Work Orders," to Ingman et al.; U.S. Patent Application Publication No. 2004/0111313, entitled "Methods and Systems for Assigning Multiple Tasks," to Ingman et al.; and U.S. Patent Application Publication No. 2004/0111634, entitled "Security Permissions for an Integrated Dispatch System," to Ingman et al.

FIG. 3 and the following discussion are intended to provide a brief, general description of the computer 110 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating the computer 110 configured to generate a NJA report, in accordance with exemplary embodiments. The computer 110 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. According to exemplary embodiments, the memory 204 includes the reallocation module 112. In one embodiment, the reallocation module 112 is embodied in computer-readable media containing instructions that, when executed by the processing unit 202, generates a GUI (not shown) containing information related to the reallocation of the technicians 102 across a plurality of the turfs 104, as described in greater detail below. Exemplary information related to the reallocation across a plurality of the turfs 104 includes, but is not limited to, the physical proximity between the technicians 102, the availability of the technicians 102, the physical proximity between the turfs 104, the existing load on each of the turfs 104, and the anticipated load on each of the turfs 104. According to further embodiments, the reallocation module 112 may be embodied in hardware, software, firmware, or any combination thereof.

As illustrated in FIG. 3, the reallocation module 112 includes the NJA report module 216. The NJA report module 216 may be displayed as part of the GUI generated by the reallocation module 112 or separate from the GUI generated by the reallocation module 112. In one embodiment, the NJA report module 216 is embodied in computer-readable media containing instructions that, when executed by the processing unit 202, generates a NJA report, such as the NJA summary report 402 of FIG. 7 and the NJA details report 404 of FIG. 8, as described in greater detail below. The information provided by the NJA report may include, but is not limited to, the names of the technicians 102 who received the NJA message, the identification (ID) number of the technicians 102 who received the message, the number of times each technician 102 received the NJA message, the type of job to which each technician 102 is dispatched after receiving the NJA message, the amount of time between receiving the NJA message and the next dispatch (i.e., lost time), the amount of time that may be disregarded from the lost time (e.g., disregarded time), the time at which the NJA message is received, the time at which each technician 102 is dispatched to the next job, and each technician's 102 field supervisor. The NJA report enables the LBS 106 or other load balancing personnel to easily and quickly determine Lost Productive Time ("LPT") and related information with respect to the technicians 102. In one embodiment, LPT is determined by subtracting the disregarded time from the lost time. According to further embodiments, the NJA report module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 110.

The user interface devices 206 may include one or more devices with which a user accesses the computer 110. The user interface devices 206 may include, but are not limited to, computers, servers, personal digital assistants, cellular phones, or any suitable computing devices. In one embodiment, the computer 110 functions as a web server located remotely from the LBS 106 by executing a web server application, such as BEA WEBLOGIC SERVER from BEA SYSTEMS. By enabling the computer 110 to function as a web server, the LBS 106 may access the GUI generated by the computer 110 over a network, such as the network 214, using, for example, a local web browser interface on a PC or other computing device.

According to exemplary embodiments, the I/O devices 208 enable a user to interface with the reallocation module 112. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, and an electronic stylus. Further, the I/O devices 208 may include one or more output devices, such as, but not limited to, a display screen and a printer.

The network devices 210 enable the computer 110 to communicate with other networks or remote systems via a network 214. Examples of the network devices 210 may include, but are not limited to, a modem, a radio frequency ("RF") or infrared ("IR") transceiver, a telephonic interface, a bridge, a router, or a network card. The network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 4 is a block diagram of a workforce reallocation system 300, in accordance with exemplary embodiments. The workforce reallocation system 300 includes the computer 110, a network dispatch center ("NDC") 302, and the data storage unit 114, each of which is operatively connected to the network 214. The NDC 302 includes a load balance PC 304, which is utilized by the LBS 106, according to one embodiment. In further embodiments, the NDC 302 may include any suitable number of load balance PCs 304 to be utilized by any suitable number of LBSs 106. The data storage unit 114 may store any suitable data regarding the technicians 102, such as their location, skills, schedule, and availability. In one embodiment, the reallocation module 112 retrieves data from the data storage unit 114 to generate a GUI. The data storage unit 114 may be a database. In one embodiment, the data storage unit 114 is an IDS.

The load balance PC 304 includes a display 306 and a mouse 308, according to one embodiment. In further embodiments, the load balance PC 304 may include any suitable input/output devices 208. It will be apparent to one having ordinary skill in the art that the load balance PC 304 may be substituted with any suitable computing device, such as a personal digital assistant or a cellular phone. The display 306 may be configured to display the NJA report provided by the NJA report module 216.

In exemplary embodiments, the load balance PC 304 includes a web browser 310, such as INTERNET EXPLORER from MICROSOFT CORPORATION, for accessing the NJA report and for facilitating communications between the LBS 106 and the computer 110. Using the web browser 310, the LBS 106 may access the NJA report by inputting a Uniform Resource Locator ("URL") into the web browser 310. The load balance PC 304 may communicate with the computer 110 via Hypertext Transfer Protocol ("HTTP"). As previously described, the computer 110 may function as a web server. In one embodiment, access to the NJA report by the load balance PC 304 may be restricted by a login screen requiring, for example, a login identification and a password. In further embodiments, communications between the load balance PC 304 and the computer 110 may be encrypted by any suitable encryption mechanism.

In exemplary embodiments, the computer 110 may communicate with the data storage unit 114 via a Java Database Connectivity ("JDBC") application program interface ("API"). In one embodiment, the computer 110 retrieves data from the data storage unit 114 at regular intervals, such as every two to five minutes. In further embodiments, the computer 110 retrieves data from the data storage unit 114 when requested by the LBS 106. In other embodiments, the reallocation module 112 may be stored on the load balance PC 304 such that the GUI is accessed from the load balance PC 304 and such that the load balance PC 304 communicates with and retrieves data from the data storage unit 114.

Figure 5:
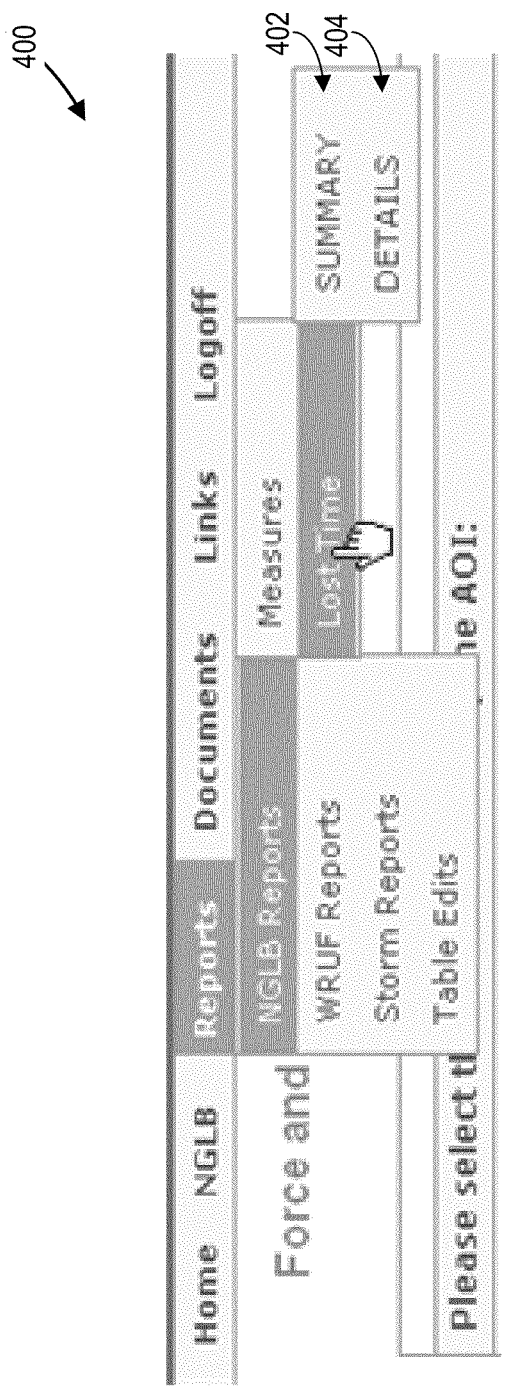
FIG. 5 is a diagram illustrating a NJA report type menu, in accordance with exemplary embodiments.
Figure 7:
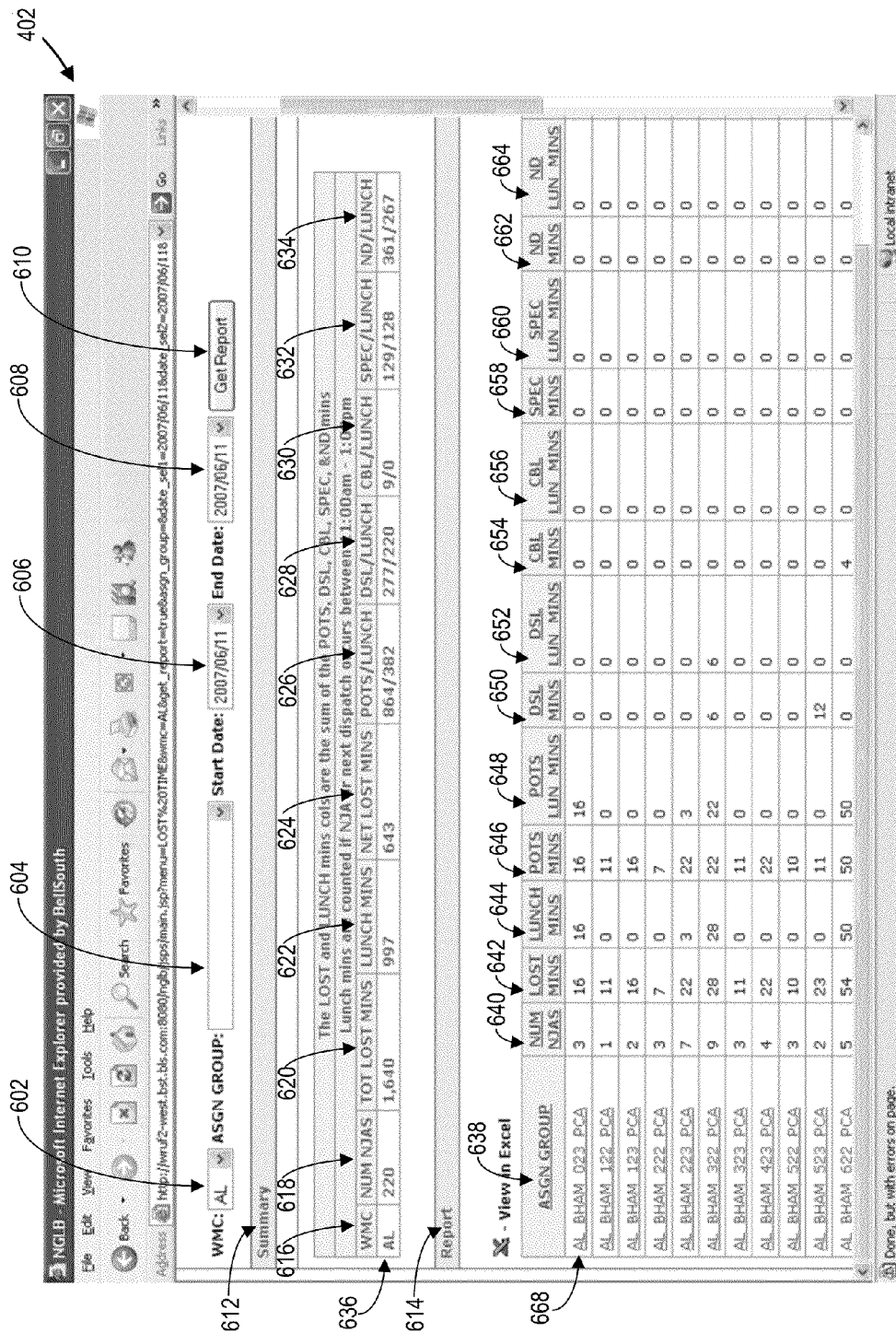
FIG. 7 is a diagram illustrating a NJA summary report, in accordance with exemplary embodiments.
Figure 8:
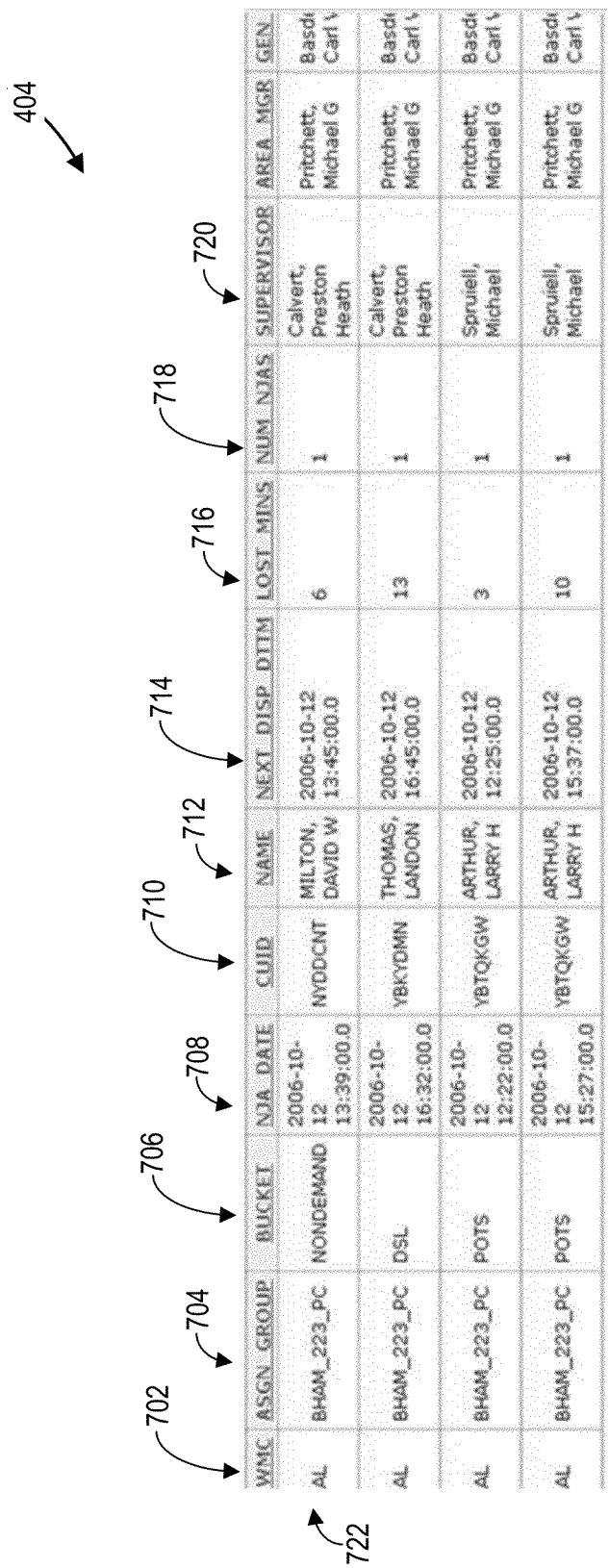
FIG. 8 is a diagram illustrating a NJA details report, in accordance with exemplary embodiments.

FIGS. 5 and 6 and the following discussion provide exemplary embodiments of GUI menus providing access to a NJA report. According to embodiments, the GUI menus enable the LBS 106 to select a type of NJA report (i.e., the NJA summary report 402 or a NJA details report 404) and to select the content of the NJA report based on various selections. FIGS. 7 and 8 and the following discussion provide exemplary embodiments of the NJA summary report 402 and the NJA details report 404, respectively. It will be apparent to one having ordinary skill in the art that FIGS. 5-7 are provided only as an illustration and are not so limited. In one example, a NJA report type menu 400 and a NJA report selection menu 500 are shown in a drop-down menu format. The NJA report selection menu 500 and the NJA report type menu 400 may be presented in any suitable format, according to further embodiments. In another example, the NJA summary report 402 and the NJA details report 404 are presented in a spreadsheet format. The NJA summary report 402 and the NJA details report 404 may be presented in any suitable format, according to further embodiments. The exemplary menus and reports described herein may also provide different selections and data.

FIG. 5 is a diagram illustrating the NJA report type menu 400, in accordance with exemplary embodiments. In one embodiment, the NJA report type menu 400 is part of the GUI generated by the reallocation module 112. The type menu 400 enables the LBS 106 to retrieve at least one of two types of NJA reports: the NJA summary report 402 and the NJA details report 404. In one embodiment, the NJA summary report 402 provides aggregated information for the technicians 102 in an assignment group, while the NJA details report 404 provides individual information for each technician 102 in the assignment group. The NJA summary report 402 and the NJA details report 404 are described in greater detail below with respect to FIGS. 7 and 8. In one embodiment, the type menu 400 is accessed by the LBS 106 using the web browser 310 in the load balance PC 304. The type menu 400 may be displayed on the display 306, and the LBS 106 may select the type of NJA report in the type menu 400 using the mouse 308.

FIG. 6 is a diagram illustrating the NJA report selection menu 500, in accordance with exemplary embodiments. In one embodiment, the NJA report selection menu 500 is provided after the LBS 106 selects a type of NJA report in the type menu 400. The selection menu 500 enables the LBS 106 to choose a NDC selection 502 (referred to in FIG. 6 as a Work Management Center ("WMC") selection), an assignment group selection 504, a start date selection 506, and an end date selection 508. In one embodiment, each NDC available in the NDC selection 502 represents a state (e.g., Georgia), and each assignment group available in the assignment group selection 504 represents a portion of the state represented by the NDC selection 502. In further embodiments, the NDC selection 502 and the assignment group selection 504 may represent any suitable geographic areas. The start date selection 506 and the end date selection 508 represent the time frame for which the NJA report is requested.

In one embodiment, one or more of the NDC selection 502, the assignment group selection 504, the start date selection 506, and the end date selection 508 may be left unselected. For example, if the start date selection 506 and the end date selection 508 are left unselected, the generated NJA report may include data for a default time frame. After selecting the NDC selection 502, the assignment group selection 504, the start date selection 506, and the end date selection 508, the LBS 106 may depress a Get Report button 510 to retrieve the NJA report.

FIG. 7 is a diagram illustrating an exemplary embodiment of the NJA summary report 402. The NJA summary report 402 is presented in a spreadsheet format, according to one embodiment. The NJA summary report 402 may be generated by any suitable spreadsheet program, such as MICROSOFT EXCEL from MICROSOFT CORPORATION. In one embodiment, the NJA summary report 402 is generated based, at least in part, on information provided by the data storage unit 114.

The NJA summary report 402 may include a NDC selection 602 (referred to in FIG. 7 as a WMC selection), an assignment group selection 604, a start date selection 606, and an end date selection 608. The NDC selection 602, the assignment group selection 604, the start date selection 606, and the end date selection 608 may correspond to the NDC selection 502, the assignment group selection 504, the start date selection 506, and the end date selection 508. As illustrated in FIG. 7, the NDC selection 602 indicates that an Alabama NDC was selected. The assignment group selection 604 indicates that no assignment group was selected. In one embodiment, selecting no assignment groups in the assignment group selection 604 is the same as selecting every assignment group in the assignment group selection 604. The start date selection 606 and the end date selection 608 indicate that a time frame within Jun. 11, 2007 was selected.

In response to depressing a Get Report button 610, a summary portion 612 and a report portion 614 may be displayed. As illustrated in FIG. 7, the summary portion 612 provides data for the NDC selected in the NDC selection 602, while the report portion 614 provides data for one or more assignment groups selected in the assignment group selection 604. The summary portion 612 may include a NDC column 616 (referred to in FIG. 7 as a WMC column), a number of NJA messages column 618, number of total lost minutes column 620, a number of lunch minutes column 622, a number of net lost minutes column 624, a number of plain old telephone service ("POTS") minutes column 626, a number of digital subscriber line ("DSL") minutes column 628, a number of cable minutes column 630, a number of specials minutes column 632, and a number of non-demand ("ND") minutes column 634.

According to exemplary embodiments, the NDC column 616 corresponds to the NDC selected via the NDC selection 602. At the row 636, the NDC column 616 indicates that the Alabama NDC was selected. According to exemplary embodiments, the number of NJA messages column 618 indicates the aggregate number of NJA received by the technicians 102 for all of the assignment groups selected in the assignment group selection 604. At the row 636, the number of NJA messages column 618 indicates that 220 NJA messages were received. According to exemplary embodiments, the number of total lost minutes column 620 indicates the aggregate amount of time lost by the technicians 102 for all of the assignment groups selected in the assignment group selection 604 between receiving a NJA message and being dispatched to the next job. At the row 636, the number of total lost minutes column 620 indicates that 1,640 minutes were lost. According to exemplary embodiments, the number of lunch minutes column 622 indicates the number of lost minutes specified the number of total lost minutes column 620 that were attributable to lunch time. At the row 636, the number of lunch minutes column 622 indicates that 997 of the 1,640 minutes were attributable to lunch time. The lunch time may be any suitable time frame, for example, between 11 am and 1 pm. According to exemplary embodiments, the number of net lost minutes column 624 indicates the LPT, which is the difference between the number of total lost minutes column 620 and the number of lunch minutes column 622. At the row 636, the number of net lost minutes column 624 is 643 minutes (i.e., 1,640-997 minutes).

According to exemplary embodiments, the number of POTS minutes column 626 indicates a number of total lost minutes and number of lunch minutes attributable to the technicians 102 assigned to a POTS bucket. At the row 636, the number of POTS minutes column 626 indicates 864 total lost minutes and 382 lunch minutes attributable to the technicians 102 assigned to the POTS bucket for POTS related work orders. According to exemplary embodiments, the number of DSL minutes column 628 indicates a number of total lost minutes and number of lunch minutes attributable to the technicians 102 assigned to a DSL bucket for DSL related work orders. At the row 636, the number of DSL minutes column 628 indicates 227 total lost minutes and 220 lunch minutes attributable to the technicians 102 assigned to the DSL bucket. According to exemplary embodiments, the number of cable minutes column 630 indicates a number of total lost minutes and number of lunch minutes attributable to the technicians 102 assigned to a cable bucket for cable related work orders. At the row 636, the number of cable minutes column 630 indicates nine total lost minutes and zero lunch minutes attributable to the technicians 102 assigned to the cable bucket. According to exemplary embodiments, the number of specials minutes column 632 indicates a number of total lost minutes and number of lunch minutes attributable to the technicians 102 assigned to a specials bucket for special circuit related work orders (e.g., Digital Signal 1 ("DS1") and Digital Signal 3 ("DS3")). At the row 636, the number of specials minutes column 632 indicates 129 total lost minutes and 128 lunch minutes attributable to the technicians 102 assigned to the specials bucket. According to exemplary embodiments, the number of ND minutes column 634 indicates a number of total lost minutes and number of lunch minutes attributable to the technicians 102 assigned to a ND bucket for work orders not assigned to the POTS, DSL, cable, and specials buckets. At the row 636, the number of ND minutes column 634 indicates 361 total lost minutes and 267 lunch minutes attributable to the technicians 102 assigned to the ND bucket.

The report portion 614 may include an assignment group column 638, a number of NJA messages column 640, number of total lost minutes column 642, a number of lunch minutes column 644, a number of POTS total minutes column 646, a number of POTS lunch minutes column 648, a number of DSL total minutes column 650, a number of DSL lunch minutes column 652, a number of cable total minutes column 654, a number of cable lunch minutes column 656, a number of specials total minutes column 658, a number of specials lunch minutes column 660, a number of ND total minutes column 662, and a number of ND lunch minutes column 664.

According to exemplary embodiments, the assignment group column 638 corresponds to the assignment group selected via the assignment group selection 604. As described above, the assignment group selection 604 indicates that all of the assignment groups were selected. As such, the assignment group column 638 includes all of the assignment groups, such as an assignment group 668, associated with the Alabama NDC selected via the NDC selection 602. The number of NJA messages column 640 indicates that three NJA messages were received by the technicians 102 in the assignment group 668. The number of total lost minutes column 642 indicates that sixteen minutes were lost between receiving a NJA message and being dispatched to the next job in the assignment group 668. The number of lunch minutes column 644 indicates that sixteen of the sixteen minutes in the number of total lost minutes column 642 were attributable to lunch time. The number of POTS total minutes column 646 and the number of POTS lunch minutes column 648 indicate sixteen total lost minutes and sixteen lunch minutes, respectively, attributable to the technicians 102 assigned to the POTS bucket. The number of DSL total minutes column 650 and the number of DSL lunch minutes column 652 indicate zero total lost minutes and zero lunch minutes, respectively, attributable to the technicians 102 assigned to the DSL bucket. The number of cable total minutes column 654 and the number of cable lunch minutes column 656 indicate zero total lost minutes and zero lunch minutes, respectively, attributable to the technicians 102 assigned to the cable bucket. The number of specials total minutes column 658 and the number of specials lunch minutes column 660 indicate zero total lost minutes and zero lunch minutes, respectively, attributable to the technicians 102 assigned to the specials bucket. The number of ND total minutes column 662 and the number of ND lunch minutes column 664 indicate zero total lost minutes and zero lunch minutes, respectively, attributable to the technicians 102 assigned to the ND bucket.

It should be appreciated that the POTS, DSL, cable, specials, and ND buckets illustrated in FIG. 7 are only exemplary. In further embodiments, the NJA summary report 402 may include different buckets. It should further be appreciated that different columns may be illustrated in FIG. 7 as contemplated by those skilled in the art.

Although not so limited, the number of lost minutes column 620 and the number of lunch minutes column 622 measure time in minutes. However, it will be apparent to one having ordinary skill in the art that the time may be measured in any suitable unit of time. Further, while FIG. 7 illustrates that only lunch minutes are disregarded from the LPT determination, it should be appreciated that other suitable time periods may be disregarded as well, according to further embodiments.

FIG. 8 is a diagram illustrating the NJA details report 404, in accordance with exemplary embodiments. The NJA details report 404 is presented in a spreadsheet format, according to one embodiment. The NJA details report 404 may be generated by any suitable spreadsheet program, such as MICROSOFT EXCEL from MICROSOFT CORPORATION. In one embodiment, the NJA details report 404 is generated based, at least in part, on information provided by the data storage unit 114.

The NJA details report 404 may include a NDC column 702 (referred to in FIG. 8 as a WMC column), an assignment group column 704, a bucket column 706, a NJA message time column 708, a technician identification ("ID") column 710, a technician name column 712, a next dispatch time column 714, a number of lost minutes column 716, a number of NJA messages column 718, and a supervisor column 720. The NDC column 702 corresponds to the NDC selection 502. At a row 722, the NDC column 702 indicates that the Alabama NDC was selected via the NDC selection 502. The assignment group column 704 corresponds to the assignment group selection 504. At the row 722, the assignment group column 704 indicates the Birmingham assignment group was selected via the assignment group selection 504. According to exemplary embodiments, the bucket column 706 indicates the discipline in which the technician 102 identified by the technician ID column 710 and the technician name column 712 is assigned based on the skill set of the identified technician 102. Exemplary buckets include, but are not limited to, a plain old telephone service ("POTS") bucket, a digital subscriber line ("DSL") bucket, and a cable bucket. The technician 102 in the POTS bucket, for example, is capable of filling POTS related work orders, and the technician 102 in the DSL bucket, for example, is capable of filling DSL related work orders.

The NJA message time column 708 may indicate the date and time at which the technician 102 identified by the technician ID column 710 and the technician name column 712 received a NJA message. In one embodiment, the NJA message time column 708 identifies the date and time of the most recent message if the technician 102 receives multiple NJA messages. The technician ID column 710 and the technician name column 712 identify a particular technician, such as the technician 102. The next dispatch time column 714 indicates the date and time at which the technician 102 identified by the technician ID column 710 and the technician name column 712 was dispatched to the next job after receiving the NJA message, according to exemplary embodiments. The number of lost minutes column 716 indicates the time lost by the technicians 102 between receiving the NJA message and being dispatched to the next job. As such, the number of minutes in the number of lost minutes column 716 is the number of minutes between the time in the NJA message time column 708 and the next dispatch time column 714. For example, at the row 722, the NJA message time column 708 indicates a time of 13:39, and the next dispatch time column 714 indicates a time of 13:45. The number of minutes between 13:39 and 13:45 is six, which is the number of minutes indicated in the number of lost minutes column 716 at the row 722.

The number of NJA messages column 718 indicates the number of NJA messages received by the technician 102 identified by the technician ID column 710 and the technician name column 712 since the time and date identified in the NJA message time column 708, according to exemplary embodiments. At the row 722, the number of NJA messages column 718 indicates that one NJA message was received. The supervisor column 720 indicates the name of the field supervisor responsible for managing the technician 102 identified by the technician ID column 710 and the technician name column 712. In one embodiment, the field supervisor is responsible for each technician 102 in a particular bucket.

Although not illustrated in FIG. 8, the NJA details report 404 may further include columns related to disregarded time. In further embodiments, the disregarded time may be determined based on information provided in the NJA details report 404. For example, a number of lunch minutes may be determined by examining the span between the time indicated in the NJA message time column 708 and the time indicated in the next dispatch time column 714, and determining the number of minutes in the span that overlaps with the lunch time. The lunch time may be any suitable time frame, for example, between 11 am and 1 pm. In one embodiment, the LPT is determined by subtracting the number of lunch minutes from the number of lost minutes. In further embodiments, the LPT may be determined by subtracting any suitable time that is not considered to be productive time.

Figure 9:
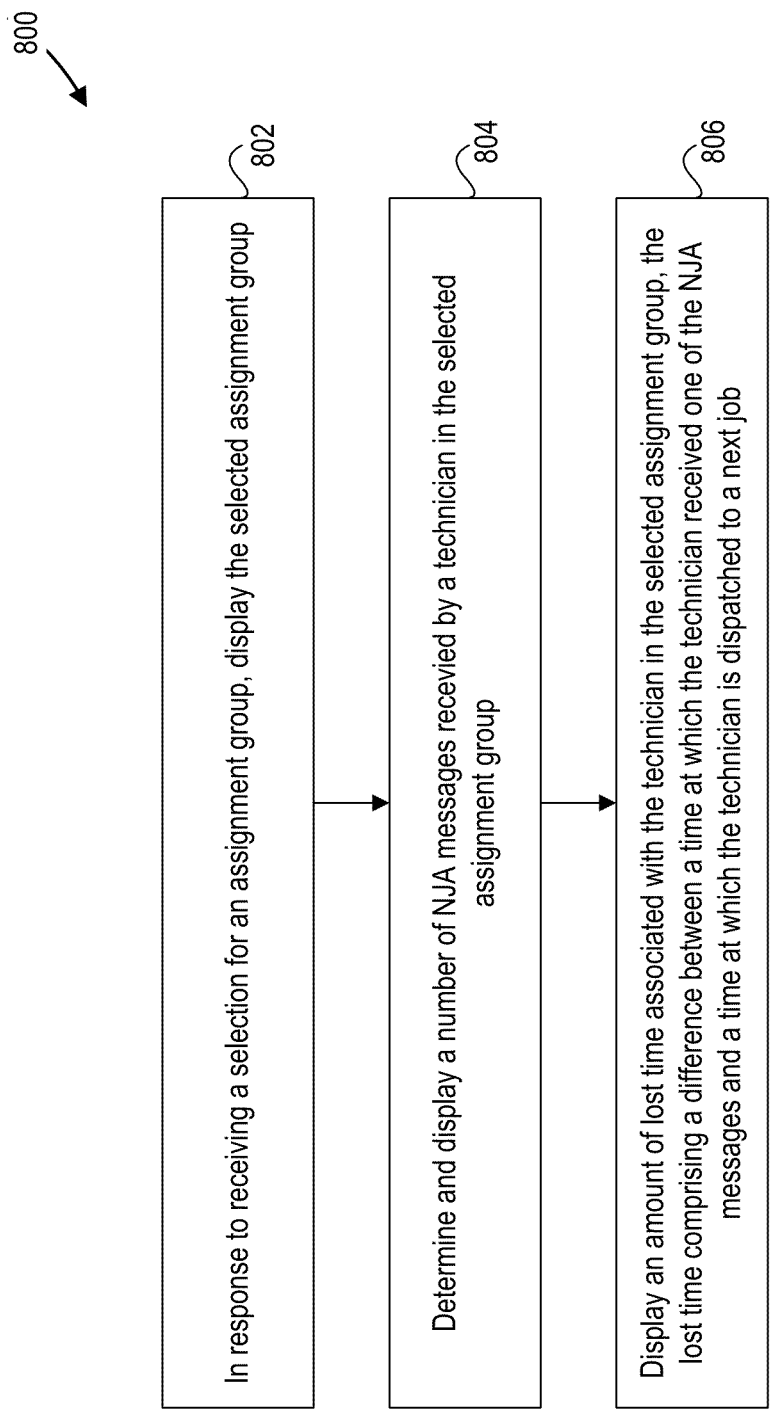
FIG. 9 is a flow diagram illustrating a method for generating a NJA report, in accordance with exemplary embodiments.

FIG. 9 is a flow diagram illustrating a method 800 for generating a report indicating job availability. After the LBS 106 selects an assignment group in the assignment group selection 504, the NJA report module 216 displays (at 802) the selected assignment group. For example, FIG. 7 shows the selected assignment group under the assignment group selection 604, and FIG. 8 shows the selected assignment group under the assignment group column 704. The NJA report module 216 displays (at 804) a number of NJA messages received by a technician, such as the technician 102, in the selected assignment group. In one embodiment, an aggregate number of NJA messages for a plurality of the technicians 102 in the selected assignment group is displayed, as illustrated in FIG. 7 under the number of NJA messages column 618. In further embodiments, the number of NJA messages received by each technician 102 in the selected assignment group is displayed, as illustrated in FIG. 8 under the number of NJA messages column 718.

The NJA report module 216 determines and displays (at 806) a number of lost minutes associated with the technician 102 in the selected assignment group. As previously described, the lost minutes are the difference between the time at which the technician 102 received one of the NJA messages and the time at which the technician 102 is dispatched to the next job. In FIG. 7, the lost minutes are indicated under the number of total lost minutes column 620. In FIG. 8, the lost minutes are indicated under the number of lost minutes column 716, which is the difference between the time shown in the NJA message time column 708 and the time shown in the next dispatch time column 714. In further embodiments, the NJA report module 216 reduces the calculated lost time (e.g., the lost minutes under the total lost minutes column 620) by an amount associated with the disregarded time (e.g., the lunch time under the lunch minutes column 622) to determine a LPT (e.g., the net lost minutes column under the net lost minutes column 624) and displays the LPT.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for generating a report indicating job availability, comprising:
   receiving, by a processor, a selection of an assignment group from a plurality of assignment groups, each of the plurality of assignment groups representing a geographic area, the report being limited to the assignment group;
   displaying, by the processor in the report, the assignment group;
   determining, by the processor, a quantity of status messages received by a technician in the assignment group, each of the status messages expressly notifying the technician that no jobs are available for the technician;
   displaying, by the processor in the report, a first numeric value of the quantity of the status messages received by the technician in the assignment group;
   determining, by the processor, an amount of lost time associated with the technician in the assignment group, the lost time comprising a difference between a time at which the technician received one of the status messages and a time at which the technician is dispatched to a next job;
   displaying, by the processor in the report, a type of the next job the technician is dispatched to after receiving the one of the status messages; and
   displaying, by the processor in the report, a second numeric value of the amount of the lost time associated with the technician in the assignment group, the report comprising a spreadsheet-formatted report having a plurality of rows, each of the plurality of rows specifying one of a plurality of technicians, the first numeric value corresponding to the one of the plurality of technicians, and the second numeric value corresponding to the one of the plurality of technicians.

2. The method of claim 1, wherein displaying, in the report, the second numeric value of the amount of the lost time associated with the technician in the assignment group comprises displaying, in the report, the second numeric value of an amount of lost minutes associated with the technician in the assignment group.

3. The method of claim 1, wherein displaying, in the report, the first numeric value of the quantity of the status messages received by the technician in the assignment group comprises displaying, in the report, the first numeric value of an aggregate quantity of status messages received by the plurality of technicians in the assignment group.

4. The method of claim 1, wherein displaying, in the report, the second numeric value of the amount of the lost time associated with the technician in the assignment group comprises displaying, in the report, the second numeric value of an aggregate amount of lost time associated with the plurality of technicians in the assignment group.

5. The method of claim 1, further comprising displaying, in the report, at least one category of time to be disregarded from the amount of the lost time for determining lost productive time.

6. The method of claim 5, wherein displaying, in the report, the at least one category of time to be disregarded from the amount of the lost time for determining the lost productive time comprises displaying, in the report, an amount of lunch time associated with the technician in the assignment group along with the amount of the lost time.

7. The method of claim 1, further comprising displaying, in the report, a bucket, the time at which the technician received the one of the status messages, the time at which the technician is dispatched to the next job, a name of the technician, and a supervisor of the technician.

8. A system for generating a report indicating job availability, comprising
   a memory for storing a program containing code for generating the report indicating job availability; and
   a processor being responsive to computer-executable instructions contained in the program which, when executed by the processor, cause the processor to perform operations comprising:
      receiving a selection of an assignment group from a plurality of assignment groups, each of the plurality of assignment groups representing a geographic area, the report being limited to the assignment group;
      displaying, in the report, the assignment group;
      determining a quantity of status messages received by a technician in the assignment group, each of the status messages expressly notifying the technician that no jobs are available for the technician;
      displaying, in the report, a first numeric value of the quantity of the status messages received by the technician in the assignment group;
      determining an amount of lost time associated with the technician in the assignment group, the lost time comprising a difference between a time at which the technician received one of the status messages and a time at which the technician is dispatched to a next job;
      displaying, in the report, a type of the next job the technician is dispatched to after receiving the one of the status messages; and
      displaying, in the report, a second numeric value of the amount of the lost time associated with the technician in the assignment group, the report comprising a spreadsheet-formatted report having a plurality of rows, each of the plurality of rows specifying one of a plurality of technicians, the first numeric value corresponding to the one of the plurality of technicians, and the second numeric value corresponding to the one of the plurality of technicians.

9. The system of claim 8, wherein the amount of the lost time associated with the technician in the assignment group comprises an amount of lost minutes associated with the technician in the assignment group.

10. The system of claim 8, wherein the quantity of the status messages received by the technician in the assignment group comprises an aggregate quantity of status messages received by the plurality of technicians in the assignment group.

11. The system of claim 8, wherein the amount of the lost time associated with the technician in the assignment group comprises an aggregate amount of lost time associated with the plurality of technicians in the assignment group.

12. The system of claim 8, wherein the operations further comprise displaying, in the report, at least one category of time to be disregarded from the amount of the lost time for determining lost productive time.

13. The system of claim 12, wherein the at least one category of time to be disregarded from the amount of the lost time for determining the lost productive time comprises an amount of lunch time associated with the technician in the assignment group.

14. A computer-readable medium having instructions stored thereon which, when executed by a processor, cause the processor to perform operations comprising:
   receiving a selection of an assignment group from a plurality of assignment groups, each of the plurality of assignment groups representing a geographic area, a report being limited to the assignment group;
   displaying, in the report, the assignment group;
   determining a quantity of status messages received by a technician in the assignment group, each of the status messages expressly notifying the technician that no jobs are available for the technician;
   displaying, in the report, a first numeric value of the quantity of the status messages received by the technician in the assignment group;
   determining an amount of lost time associated with the technician in the assignment group, the lost time comprising a difference between a time at which the technician received one of the status messages and a time at which the technician is dispatched to a next job;
   displaying, in the report, a type of the next job the technician is dispatched to after receiving the one of the status messages; and
   displaying, in the report, a second numeric value of the amount of the lost time associated with the technician in the assignment group, the report comprising a spreadsheet-formatted report having a plurality of rows, each of the plurality of rows specifying one of a plurality of technicians, the first numeric value corresponding to the one of the plurality of technicians, and the second numeric value corresponding to the one of the plurality of technicians.

15. The computer-readable medium of claim 14, wherein displaying, in the report, the second numeric value of the amount of the lost time associated with the technician in the assignment group comprises displaying, in the report, the second numeric value of an amount of lost minutes associated with the technician in the assignment group.

16. The computer-readable medium of claim 14, wherein displaying, in the report, the first numeric value of the quantity of the status messages received by the technician in the assignment group comprises displaying, in the report, the first numeric value of an aggregate quantity of status messages received by the plurality of technicians in the assignment group.

17. The computer-readable medium of claim 14, wherein displaying, in the report, the second numeric value of the amount of the lost time associated with the technician in the assignment group comprises displaying, in the report, the second numeric value of an aggregate amount of lost time associated with the plurality of technicians in the assignment group.

18. The computer-readable medium of claim 14, wherein the operations further comprise displaying, in the report, at least one category of time to be disregarded from the amount of the lost time for determining lost productive time.

19. The computer-readable medium of claim 18, wherein displaying, in the report, the at least one category of time to be disregarded from the amount of the lost time for determining the lost productive time comprises displaying, in the report, an amount of lunch time associated with the technician in the assignment group along with the amount of the lost time.

20. The computer-readable medium of claim 14, wherein the operations further comprise displaying, in the report, a bucket, the time at which the technician received the one of the status messages, the time at which the technician is dispatched to the next job, a name of the technician, and a supervisor of the technician.

\* \* \* \* \*